(12) United States Patent
Hyun et al.

(10) Patent No.: US 7,181,256 B2
(45) Date of Patent: Feb. 20, 2007

(54) MOBILE TERMINAL WITH HINGE STYLUS AND SUB-INPUTTING UNIT

(75) Inventors: Sang-Min Hyun, Koyang-shi (KR); Seung-Min Park, Seoul (KR); Jung-Hyeok Im, Songnam-shi (KR); Ji-Young Lee, Cheju-shi (KR); In-Gon Pak, Seoul (KR); Sung-Kwon Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 464 days.

(21) Appl. No.: 10/334,562

(22) Filed: Dec. 31, 2002

(65) Prior Publication Data

US 2003/0125094 A1    Jul. 3, 2003

(30) Foreign Application Priority Data

Dec. 31, 2001    (KR) ................................ 2001-89138

(51) Int. Cl.
*H04M 1/03*    (2006.01)
(52) U.S. Cl. ............................... 455/575.3; 455/556.2; 455/566; 379/433.13; 345/173; 345/179; 361/686
(58) Field of Classification Search ............. 455/575.3, 455/566; 16/262, 231, 229, 230; 379/433.13
See application file for complete search history.

(56) References Cited

U.S. PATENT DOCUMENTS

| 5,179,502 | A | | 1/1993 | Matsuda |
| 5,422,442 | A | * | 6/1995 | Gouda et al. ............. 178/19.01 |
| 6,266,236 | B1 | * | 7/2001 | Ku et al. ..................... 361/681 |
| 6,466,202 | B1 | * | 10/2002 | Suso et al. .................. 345/169 |
| 6,594,142 | B2 | * | 7/2003 | Katz .......................... 361/680 |
| 6,894,661 | B1 | * | 5/2005 | Tuli ........................... 345/1.1 |
| 2001/0027121 | A1 | * | 10/2001 | Boesen ....................... 455/556 |

* cited by examiner

*Primary Examiner*—Lester G. Kincaid
*Assistant Examiner*—Matthew C. Sams
(74) *Attorney, Agent, or Firm*—The Farrell Law Firm

(57) ABSTRACT

Disclosed is a mobile terminal having a hinge stylus and an sub-inputting unit. The terminal comprises: (a) a first housing having a first rim portion disposed along an edge and a first receiving portion disposed for a predetermined length in the first rim portion; (b) a hinge stylus detachably attached to the first receiving portion of the first rim portion; (c) a second housing having a second rim portion disposed along an edge and a second receiving portion disposed in the second rim portion for detachably receiving the hinge stylus; and (d) a dual hinge having with one being received in the first receiving portion and the other one being coupled to the second housing for connecting the first and second housings in a rotatable manner to provide two axes.

11 Claims, 17 Drawing Sheets

MOBILE TERMINAL WITH HINGE STYLUS AND SUB-INPUTTING UNIT

PRIORITY

This application claims priority to an application entitled "Mobile Terminal with Hinge Stylus and Sub-inputting Unit" filed in the Korean Intellectual Property Office on Dec. 29, 2001 and assigned Serial. No. 2001-89138, the contents of which are incorporated herein by reference.

BACKGROUND OF THE INVENTION

1. Field of the Invention

The present invention relates to a mobile terminal, and in particular, to a mobile terminal which comprises a hinge stylus.

2. Description of the Related Art

As is well known in the art, "mobile terminals" are electronic devices such as a notebook, a Personal Digital Assistant (PDA), a cellular phone, a PCS phone and so on. Such mobile terminals can execute radio communication with counterparts while essentially comprising a data input/output unit, transmitting/receiving unit and an antenna unit. The data input unit generally utilizes a keypad having alpha-numeric keys by which a user can input data, or a touch screen by which a user can input data via touch operation. The data output unit generally utilizes an LCD which displays information generated in the mobile terminal. Furthermore, the transmitting/receiving unit generally utilizes a microphone unit and a speaker unit. It will be apparent to those skilled in the art the operation of the general input/output units and transmitting/receiving units of the mobile terminal.

From among the above mobile terminals, the following description will adopt the touch screen by the way of example. Known touch screens use a touch sensitive panel and a "stylus" for conveniently inputting desired data. The stylus is a device shaped as a pen so that a user touches the touch screen with the stylus to input data.

The stylus is generally attached to a terminal body via a string or mounted to a predetermined position in the body via an additional receiving unit.

However, the stylus is used merely for data input, not for any other functions. Further, it is inconvenient to carry the terminal body in which the stylus is received.

Further, as the internet is currently changing into a multimedia-based atmosphere and various radio services such as internet chatting, internet game and internet mail transmission are provided via terminals, the terminals are required to have more functions. Accordingly, a mobile terminal needs an auxiliary data input unit as the mobile terminals gradually have more functions. However, an input unit in a conventional mobile terminal is insufficient to satisfy these needs. For example, it is inconvenient to input data with a keypad available in the conventional mobile terminals for a conventional data input unit since it has only 15 to 20 keys. In particular, data input operation is awkward in text transmission or game modes.

SUMMARY OF THE INVENTION

Accordingly, the present invention solves the foregoing problems and it is an object of the present invention to provide a mobile terminal having a stylus which can perform both a hinge and a stylus function.

It is another object of the invention to provide a mobile terminal which is provided with sub-inputting means.

According to an aspect of the invention to obtain the above objects, provided is a mobile terminal comprising: (a) a first housing having a first rim portion disposed along an edge and a first receiving portion disposed for a predetermined length in the first rim portion; (b) a hinge stylus detachably attached to the first receiving portion of the first rim portion; (c) a second housing having a second rim portion disposed along an edge and a second receiving portion disposed in the second rim portion for detachably receiving the hinge stylus; and (d) a dual hinge having with one being received in the first receiving portion and the other one being coupled to the second housing for connecting the first and second housings in a rotatable manner to provide two axes.

According to another aspect of the invention to obtain the above objects, it is provided a mobile terminal comprising: (a) a first housing having a first rim portion disposed along an edge and a first receiving portion disposed for a predetermined length in the first rim portion; (b) a hinge stylus detachably attached to the first receiving portion of the first rim portion; (c) a second housing having a second rim portion disposed along an edge and a second receiving portion disposed in the second rim portion for detachably receiving the hinge stylus; and (d) a dual hinge for receiving the hinge stylus in a longitudinal direction, wherein the dual hinge is coupled to the first and second receiving portions via the hinge stylus received therein for connecting the first and second housings in a rotatable manner to provide two hinge axes.

BRIEF DESCRIPTION OF THE DRAWINGS

The above and other objects, features and other advantages of the present invention will be more clearly understood from the following detailed description taken in conjunction with the accompanying drawings, in which:

FIGS. 7A to 7C illustrate the construction of the hinge stylus adopted in the terminal according to an embodiment of the present invention, in which FIG. 7A is a front elevation view thereof, FIGS. 7B and 7C are partially broken cross-sectional views thereof;

FIGS. 8A to 8B illustrate the construction of a dual hinge stylus adopted in the terminal according to an embodiment of the present invention, in which FIG. 8A is a front elevation view thereof, FIG. 8B is a partially broken cross-sectional view thereof;

FIGS. 12A and 12B illustrate another dual hinge adopted in the terminal according to an embodiment of the present invention, in which FIG. 12A is a plan view thereof, and FIG. 12B is a partially broken cross-sectional view.

DETAILED DESCRIPTION OF THE PREFERRED EMBODIMENT

The following detailed description will present a preferred embodiment of the invention in reference to the accompanying drawings, in which well-known functions or constructions will not be described in detail since they would unnecessarily obscure the understanding of the invention.

Figure 1:
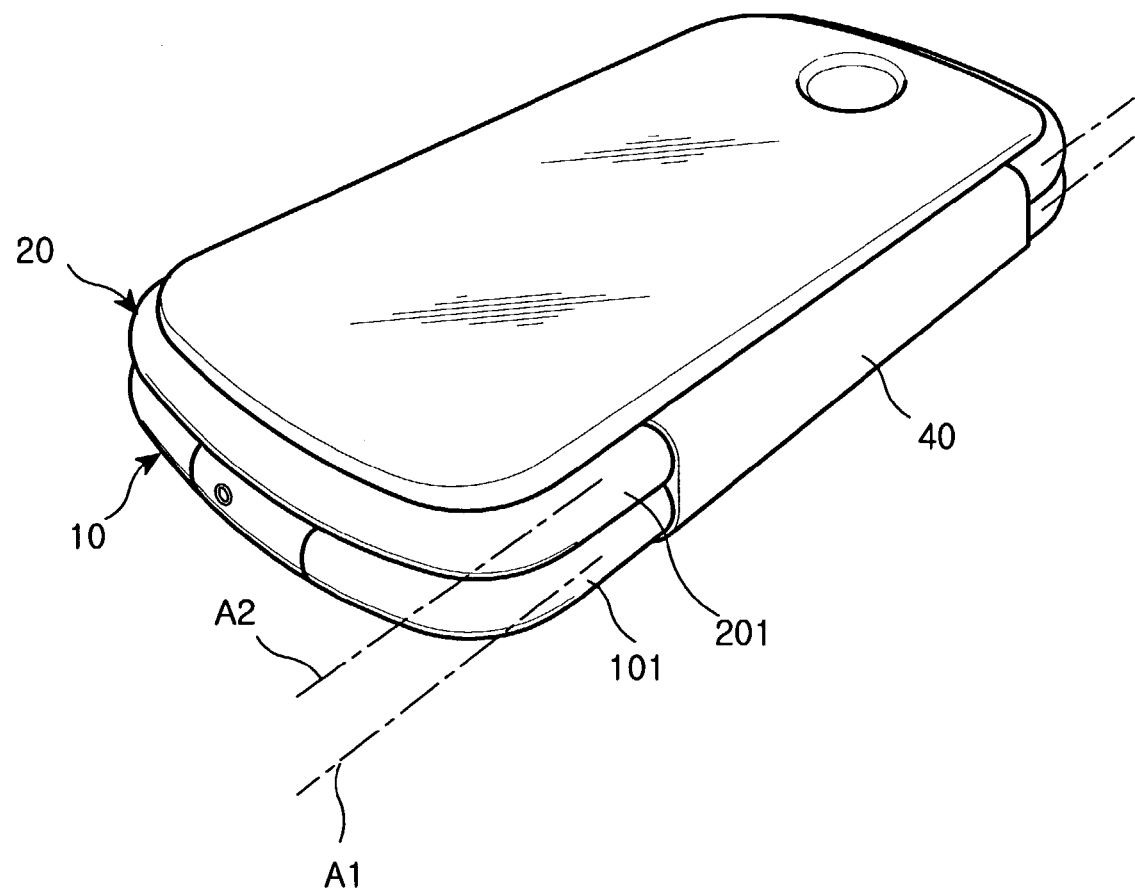
FIGS. 1 and 2 are perspective views of a terminal with the second housing being closed to the first housing according to an embodiment of the present invention.
Figure 2:
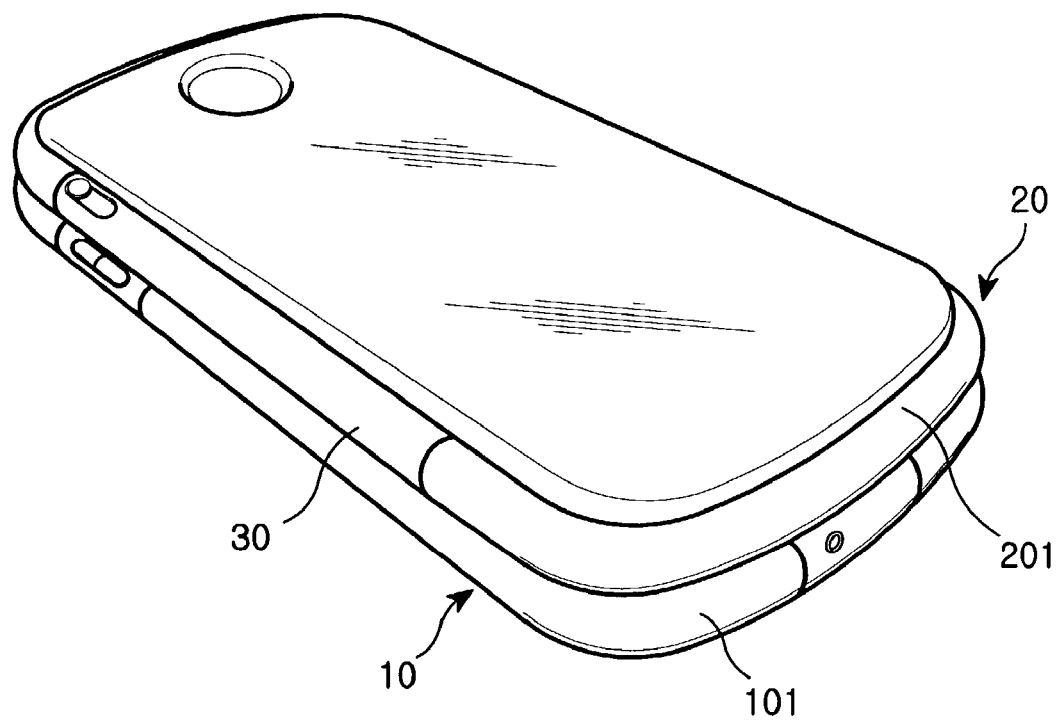
Figure 3:
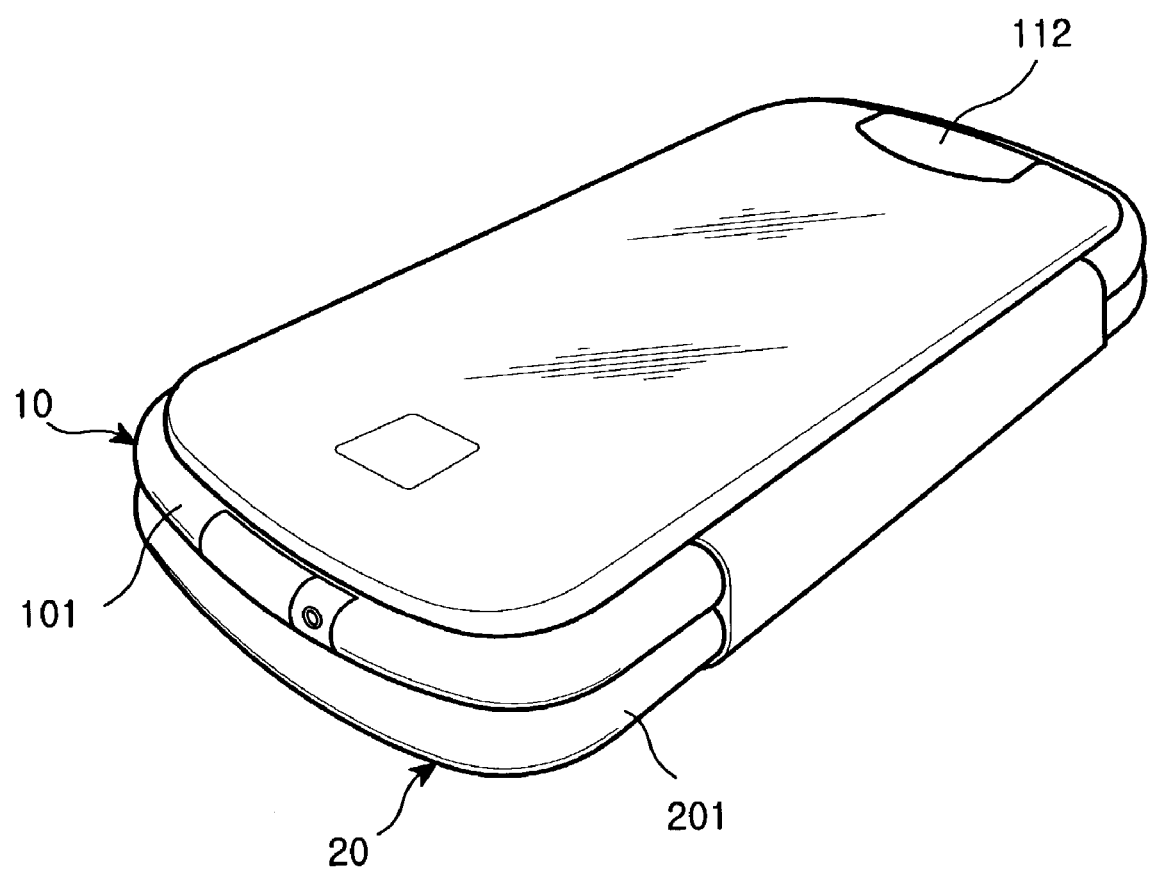
FIG. 3 is a perspective view illustrating the underside of the terminal according to an embodiment of the present invention.

As shown in FIGS. 1 to 3, a mobile terminal according to a preferred embodiment of the invention is received in one of the first and second housings 10 and 20 while executing a data input operation with a hinge stylus 30. The mobile terminal can also use the second housing as sub-inputting means by hingeably connecting the first and second housings via a dual hinge or a hinge stylus/dual hinge. The hinge stylus carries out two functions, i.e. a hinge function and a stylus function, and further serves to connect the second housing functioning as the sub-inputting unit to the first housing.

The mobile terminal of the invention comprises the first housing 10, a hinge stylus 30 detachably mounted to the first housing 10, the second housing 20 capable of receiving the hinge stylus 30 and a dual hinge 40 for rotatably connecting the first and second housings 10 and 20 to receive the first and second hinge shafts (now shown) along hinge lines A1 and A2. That is to say, among the above two hinge shafts, the first hinge shaft along hinge line A1 is the rotation shaft of the first housing 10, and the second hinge shaft along hinge line A2 is the rotation shaft of the second housing 20.

Figure 4:
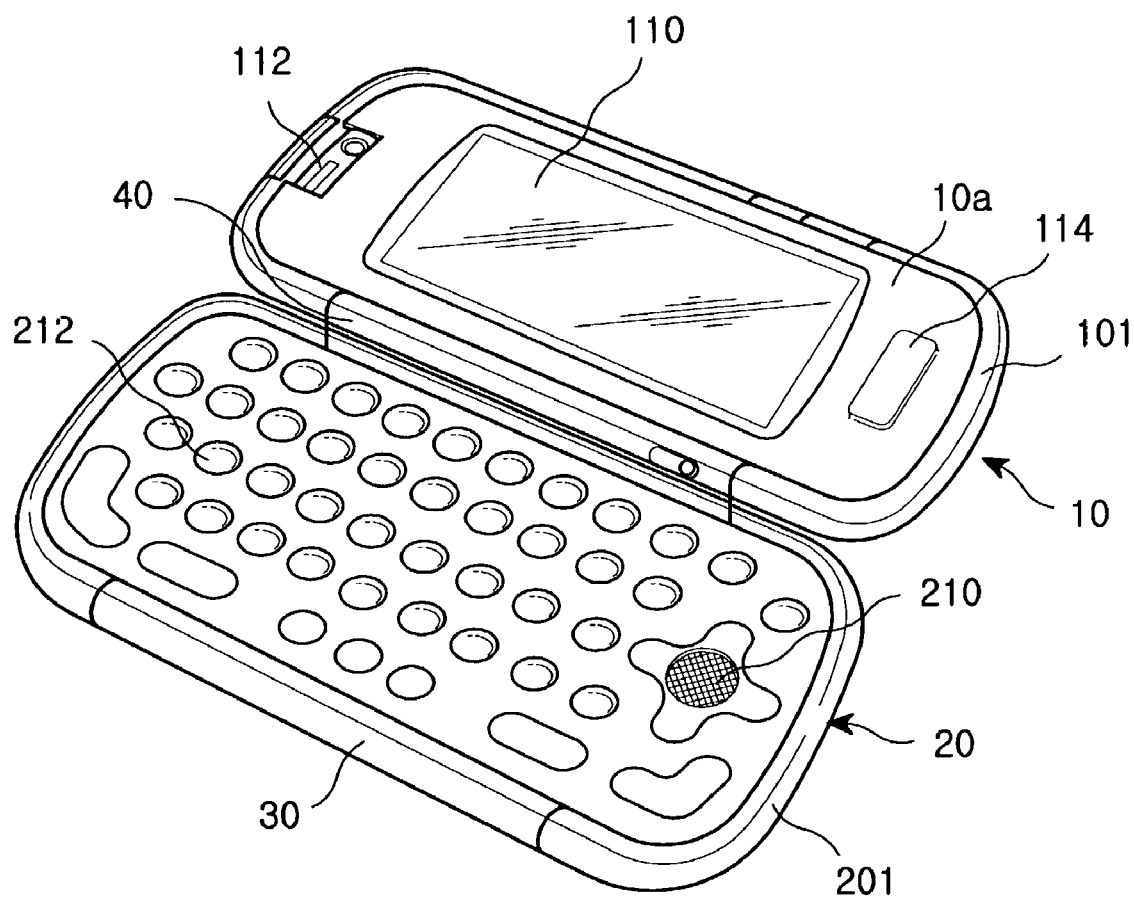
FIG. 4 is a perspective view of the terminal with the second housing being opened from the first housing according to an embodiment of the present invention.

The first housing 10 is provided with the first rim portion 101 along its edge. The first rim portion 101 is shaped as a cylinder and made, for example of metal. The first housing 10 comprises an upper plane 10a, as shown in FIG. 4, which has a wide touch screen 110, a lens housing 112 with a rotatable camera lens in an upper portion, and a speaker 114 in a lower portion. Speaker holes can be distributed in the entire region of the upper plane 10a except for the lens housing and the wide touch screen.

The second housing 20 is provided with the second rim portion 201 along its edge. The second rim portion is shaped as a cylinder and made, for example, of metal. The second housing 20 has a microphone unit 210 and a plurality of keys 212 in the entire region of the second housing 20. First housing 10 is shown rotated open by 180 degrees with respect to second housing 20.

The first and second rim portions 101 and 201 respectively comprise the first and second receiving portions each for detachably receiving the hinge stylus 30. The first and second receiving portions are cylindrically shaped.

Figure 5:
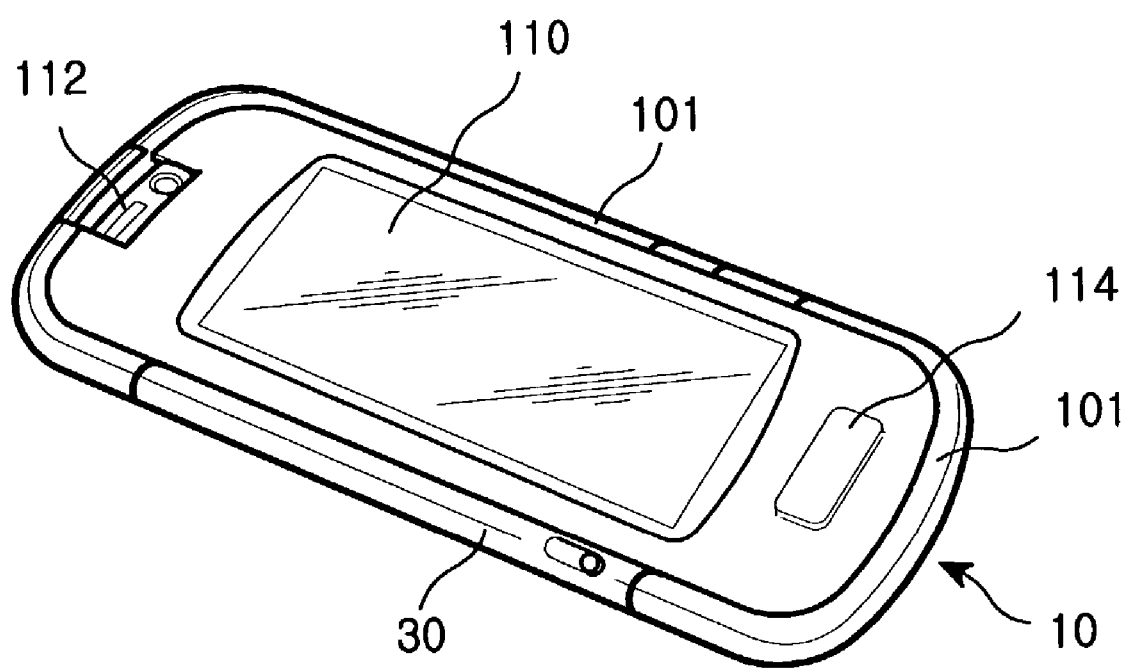
FIG. 5 is a perspective view of the terminal which the first housing is detached according to an embodiment of the present invention.
Figure 6:
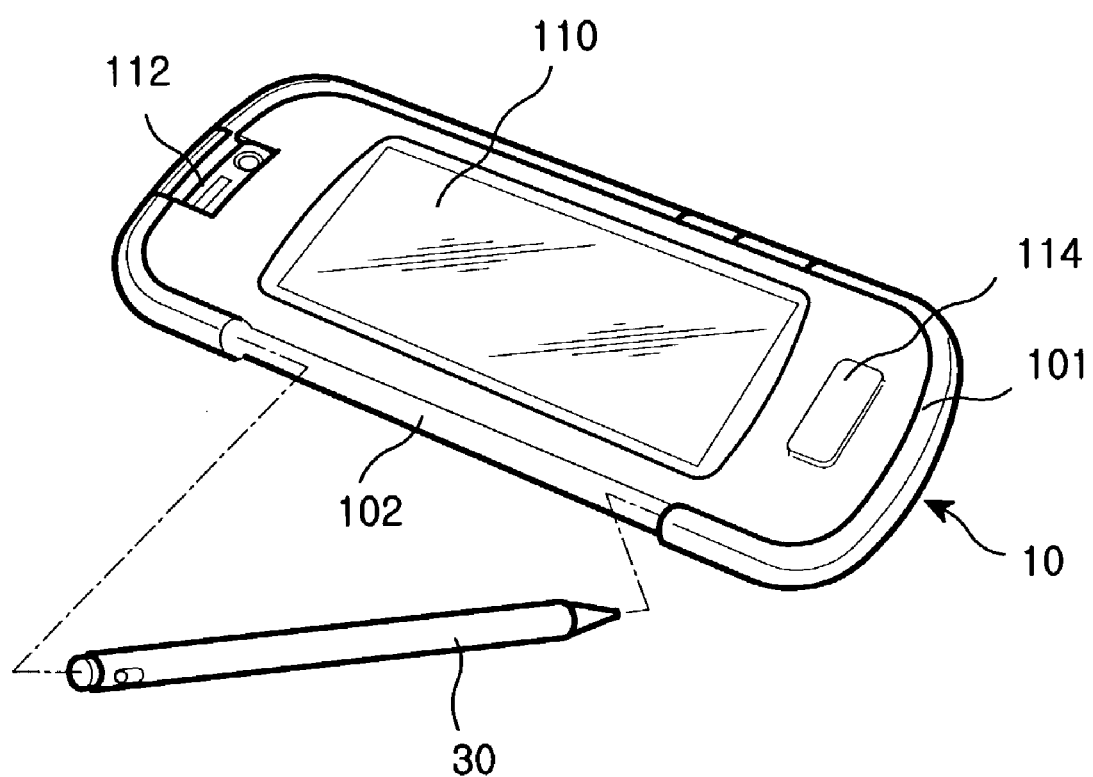
FIG. 6 is a perspective view of a hinge stylus detached from the first housing of the terminal according to an embodiment of the present invention.

As shown in FIGS. 5 and 6, where the first housing 10 is separated from the second housing 20 as shown in FIG. 6, the hinge stylus 30 is used to input data into the wide touch screen 110. Otherwise the hinge stylus 30 is mounted on the first receiving portion 102 in the first rim portion 101 as shown in FIG. 5.

Figure 7A:
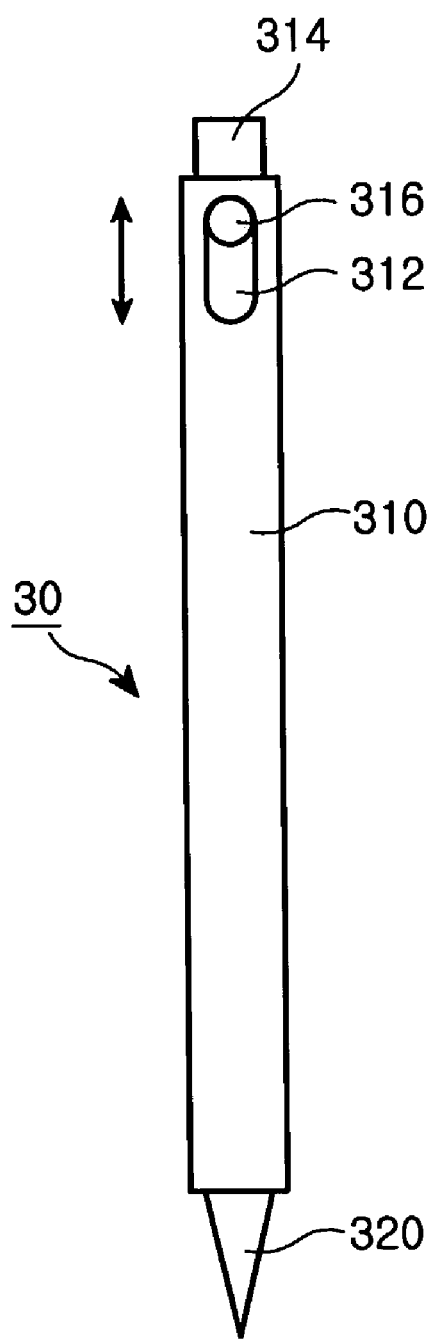
Figure 7B:
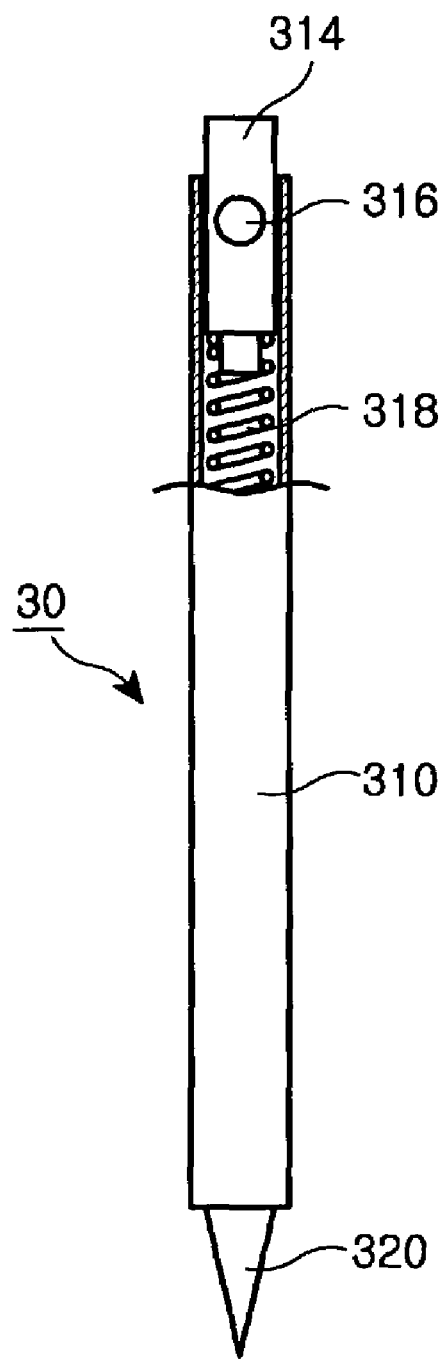
Figure 7C:
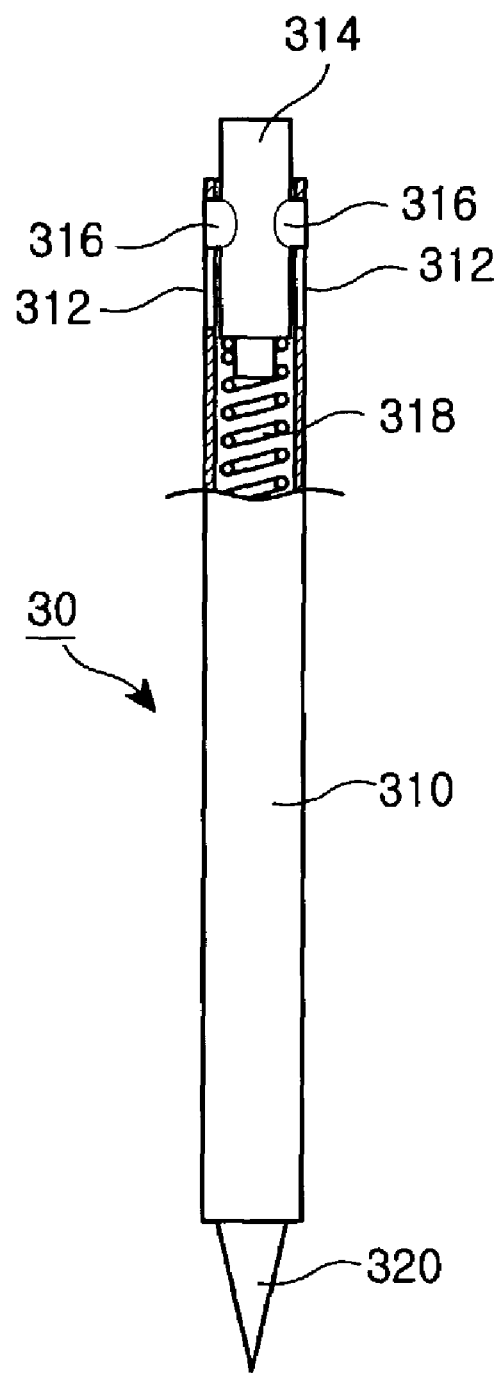

Referring to FIGS. 7A to 7C, the construction of the hinge stylus 30 according to an embodiment of the present invention will be described. The hinge stylus 30 comprises a stylus body 310 having two opening 312 shaped along the longitudinal direction thereof and located on opposite sides of stylus body 310, an attaching unit provided in the opening 312 of the stylus body 310 and a conical portion 320 in the other end of the stylus body 310. The attaching unit comprises a hinge protrusion 314 which is movably guided in the longitudinal direction within one portion of the stylus body 310 for restraining one end of the stylus body 310, a spring 318 received within the one end of the stylus body 310 for forcing hinge protrusion 314 out of the stylus body 310 and fitting portions 316 which are projected through the openings 312 for preventing release of the hinge protrusion 314 from the stylus body 310 and allowing movement of the same along the openings 312.

The openings 312 are provided in the longitudinal direction and symmetric to each other. That is, the fitting portions 316 are symmetric to each other, respectively, in the openings 312. When a user presses a tip of the hinge protrusion 314, the hinge protrusion 314 is forced into the stylus body 310. If the user releases the pressing force, the hinge protrusion 314 is projected out of the stylus body 310 by the force of spring 318. Of course, the fitting portions 316 restrains movement of the hinge protrusion 314 within a preset range equal to the size of openings 312. The hinge protrusion 314, the stylus body 310 and the fitting portions 316 are each cylindrically shaped. However, it is not intended to restrict the hinge protrusion 314 or the stylus body into a cylindrical configuration.

Figure 8A:
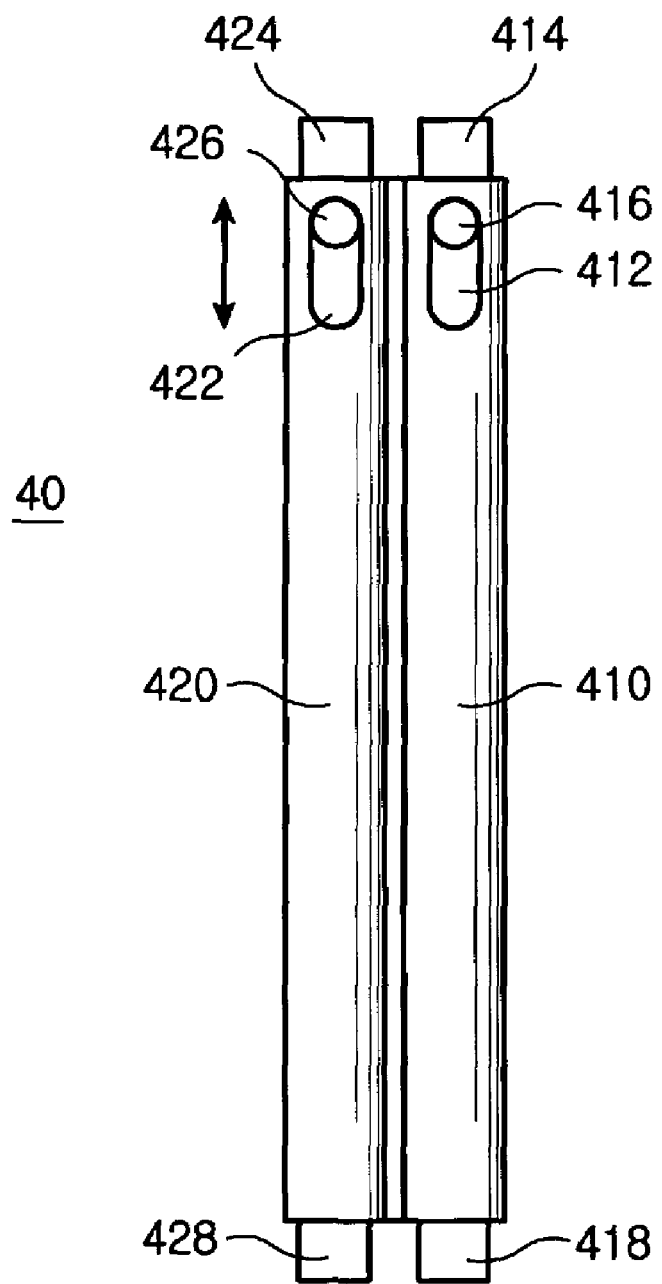
Figure 8B:
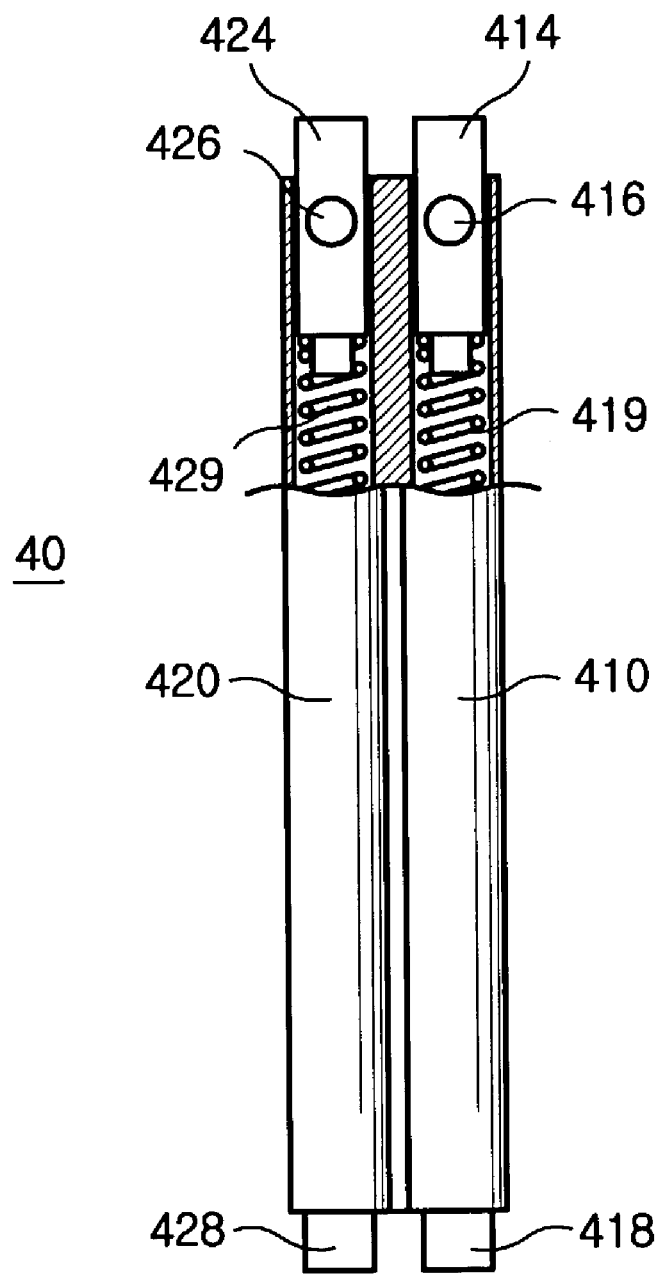

Referring to FIGS. 8A and 8B, a description will be made regarding the construction of the dual hinge 40 according to an embodiment of the present invention. The dual hinge 40 comprises first and second hinge bodies 410 and 420 having first and second cylindrical bodies which are longitudinally extended, first and second attaching units are provided in one portion of the first and second hinge bodies 410 and 420 and the first and second fixing hinge protrusions 418 and 428 are respectively provided in the other portions of the first and second hinge bodies 410 and 420. The first hinge body 410 of the dual hinge 40 is connected to the first housing 10, and the second hinge body 420 is connected to the second housing 20. Therefore, the dual hinge 40 has first and second hinge axes along hinge lines A1 and A2 for connecting the first and second housings in a mutually rotatable manner.

The hinge bodies 410 and 420 are each provided with the first and second openings 412 and 422. The first and second attaching units are received within the first and second openings 412 and 422. The first and second attaching units have the same configuration so that the following description will present only the construction of the first attaching unit without describing that of the second attaching unit.

The first attaching unit has the first hinge protrusion 414 which is movably guided in the longitudinal direction within one portion of the hinge body 410 for restraining one end of the first hinge body 410, a spring 419 received in the one end of the first hinge body 410 for forcing the first hinge protrusion 414 in a direction out of the first hinge body 410, and a fitting portion 416 which is projected through the first opening 412 for preventing release of the hinge protrusion 414 from the first hinge body 410 and allowing movement of the same along the first opening 412.

The first hinge protrusion 414 is guided in the longitudinal direction of the first hinge body 410 and restrained in movement by the first fitting portion 416. The first hinge protrusion 414 can be attached/detached according to movement of the first hinge protrusion 416.

Figure 9:
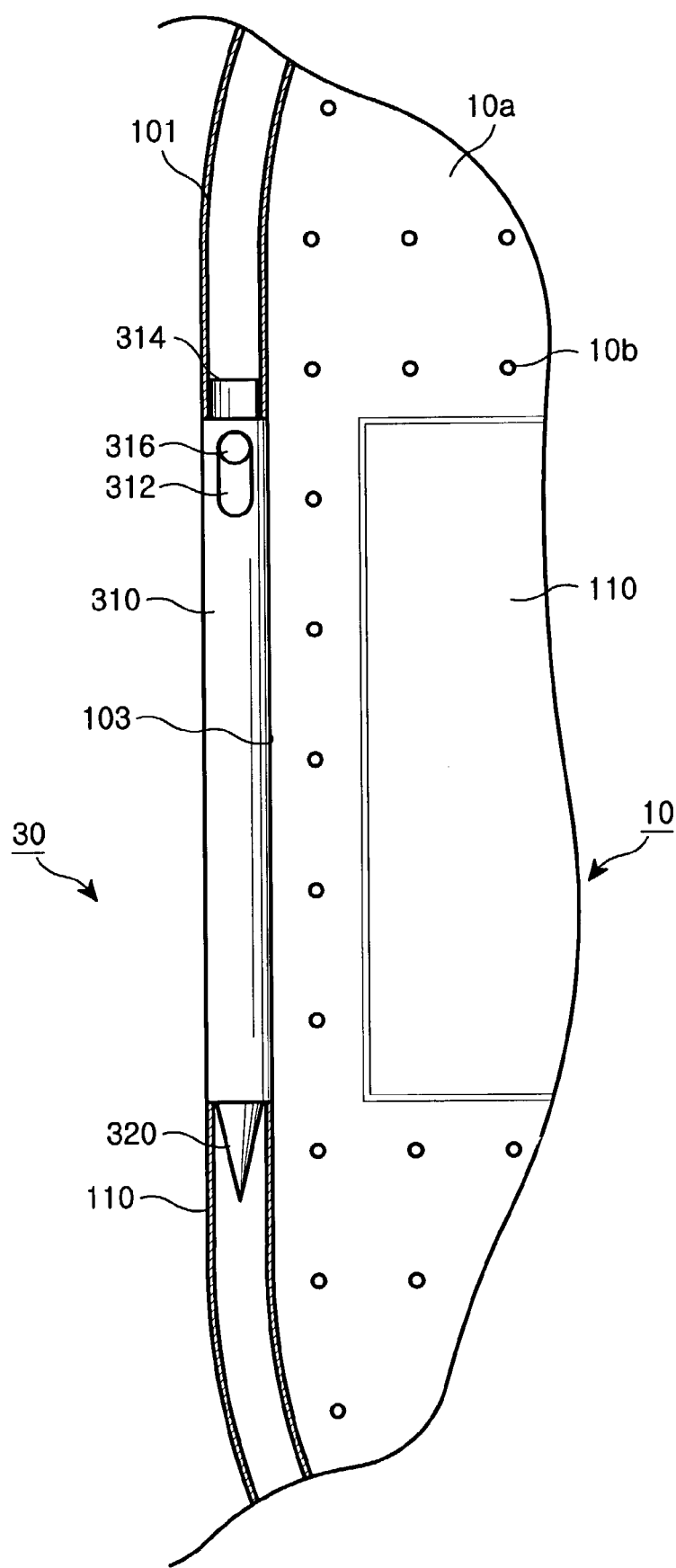
FIG. 9 is a plan view of the hinge stylus mounted on the first housing of the terminal according to an embodiment of the present invention.

FIG. 9 is a plan view illustrating the hinge stylus 30 mounted in the first housing 10. As shown in FIG. 9, the hinge stylus 30 is mounted on the first receiving portion 103 of the first housing 10. If the user desires to input data into the wide touch screen 110, he/she detaches the hinge stylus 30 from the first receiving portion 103. In order to detach the stylus body 310 from the first rim portion 101, the fitting portion 316 of the hinge protrusion 314 is pulled downward to release the hinge protrusion 314 from the first rim portion 101 and then the stylus body 310 is separated from the first rim portion 101. Such attached and detached positions of the hinge stylus 30 are shown in FIGS. 5 and 6.

Figure 10:
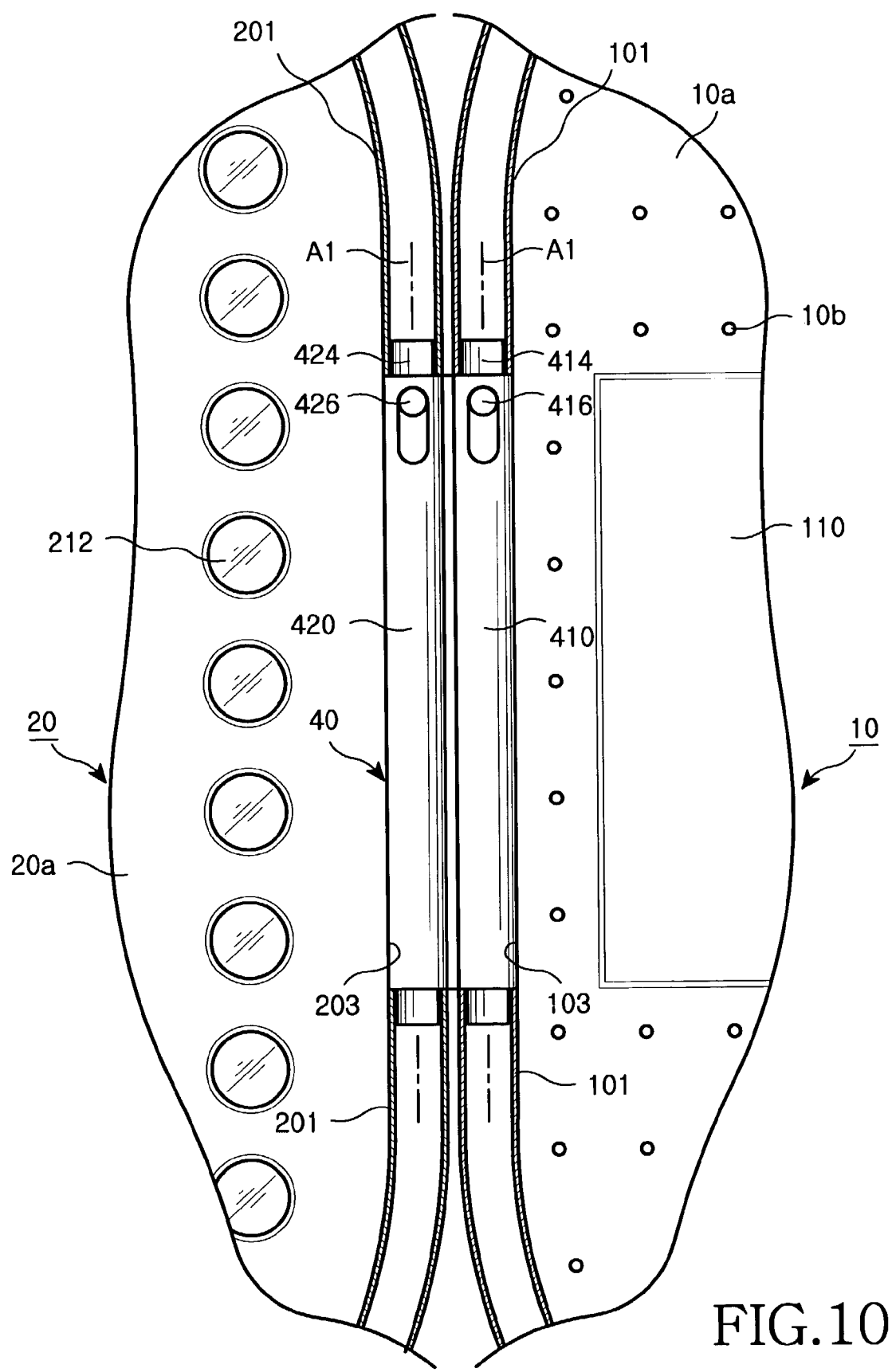
FIG. 10 is a plan view of the dual hinge adopted in the terminal according to an embodiment of the present invention.

FIG. 10 is a plan view illustrating the dual hinge 40 connected to the first and second housings 10 and 20. As shown in FIG. 10, the first body 410 of the dual hinge 40 is connected to the first housing 10, and the second hinge body 420 is connected to the second housing 20. The hinge axes along hinge lines A1 and A2 of the first and second housings 10 and 20 are respectively positioned in the centers of the first and second hinge bodies 410 and 420. The first hinge body 410 is inserted and coupled into the first receiving portion 103 of the first rim portion 101, and the second hinge body 420 is inserted and coupled into the second receiving portion 203 of the second rim portion 201.

In order to detach the second housing 20 from the first housing 10, the user pulls down the first fitting portion 416 to remove the first hinge protrusion 414 from the first rim portion 101.

Figure 11:
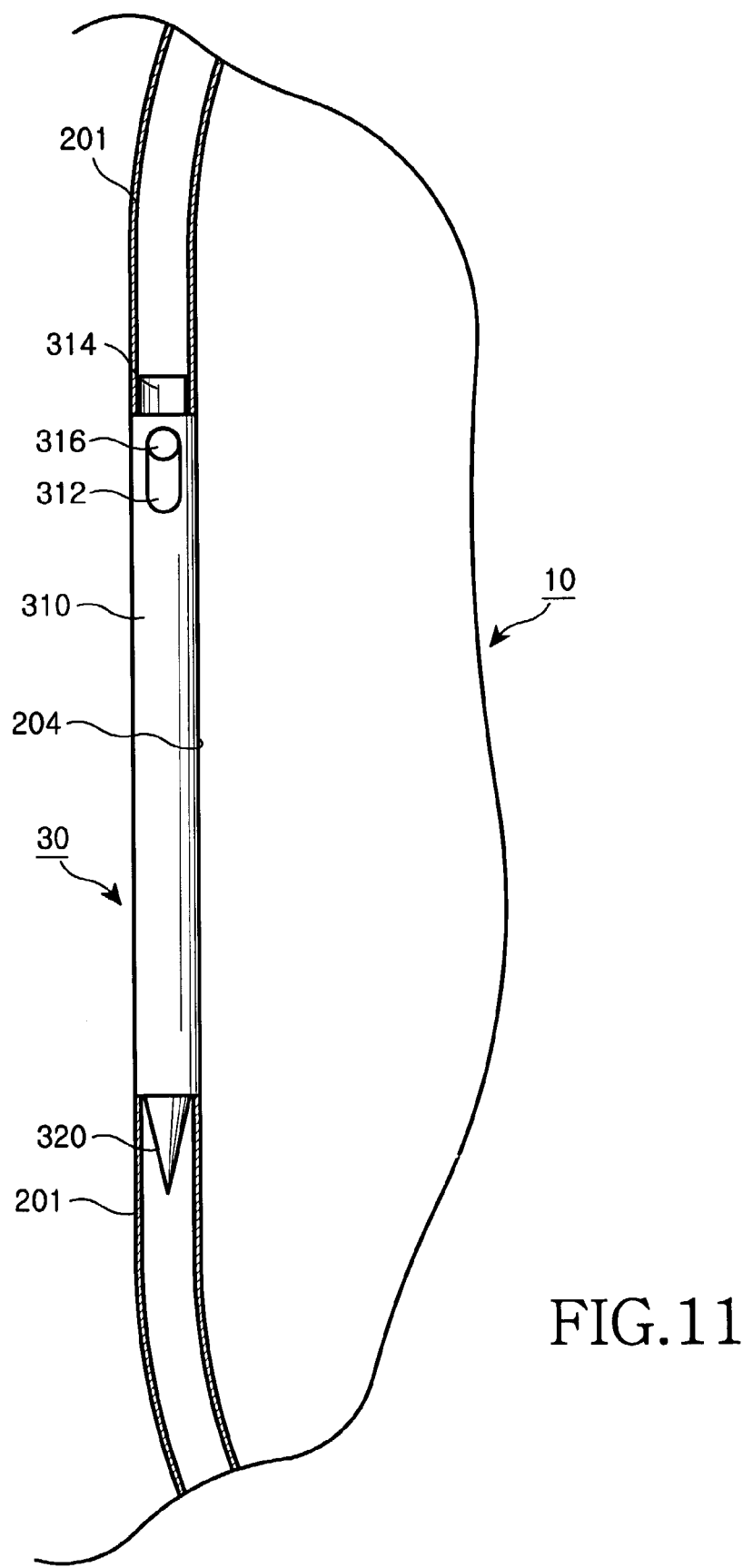
FIG. 11 is a plan view of the hinge stylus mounted on the second housing of the terminal according to an embodiment of the present invention.

Upon coupling the first hinge body 410 to the first receiving portion 103 of the first rim portion and the second hinge body 420 to the second receiving portion 203 of the second rim portion 201, the hinge stylus 30 is mounted on the third receiving portion 204 provided in the second rim portion 201 of the second housing. This position is shown in FIG. 11. That is, the hinge stylus 30 is attached/detached to/from the first housing 10 where the first housing 10 is independently used as a mobile terminal. Where the second hinge body 420 is coupled to the second receiving portion 203 of the second rim portion 201, the hinge stylus 30 is received in the third receiving portion 204 provided in the second rim portion 201 of the second housing. This position is shown in FIG. 11. That is, where the first housing 10 is independently used as a mobile terminal, the hinge stylus 30 is attached/detached to/from the first housing 10. Where the second housing 20 is connected to the first housing 10, the hinge stylus is mounted on the third receiving portion 204 in the second housing 20.

Also as shown in FIG. 10, when the second housing 20 is coupled to the first housing 10 via the dual hinge 40, the user uses the second housing 20 as a sub-inputting unit. The second housing 20 in use for the sub-inputting unit has at least thirty keys 212 arranged therein.

Figure 12A:
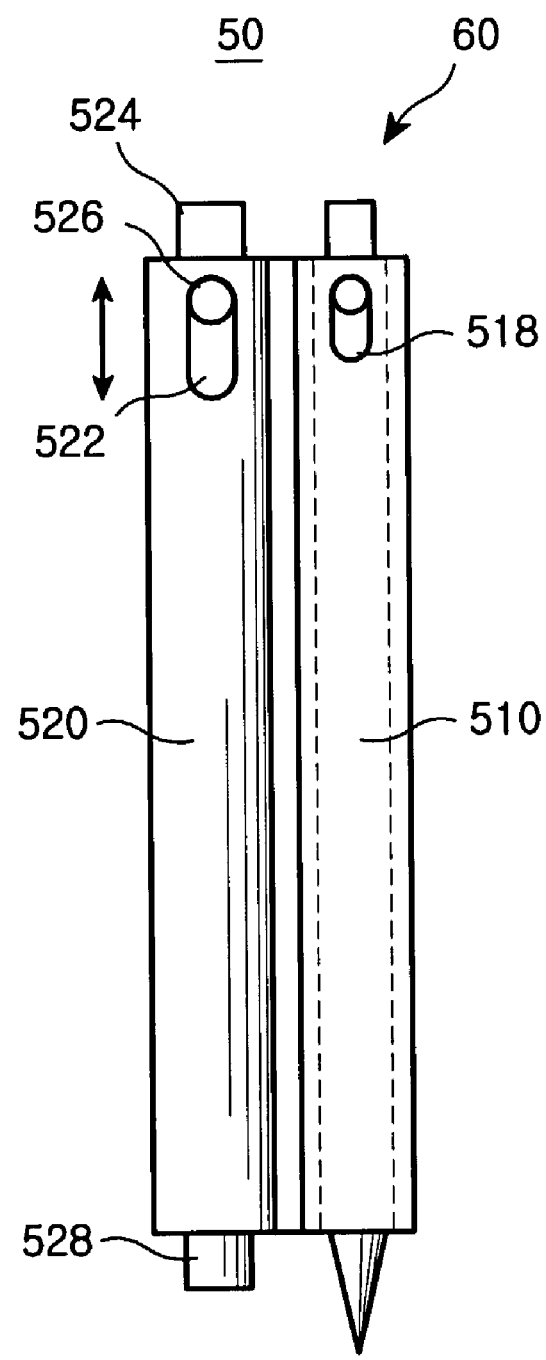
Figure 12B:
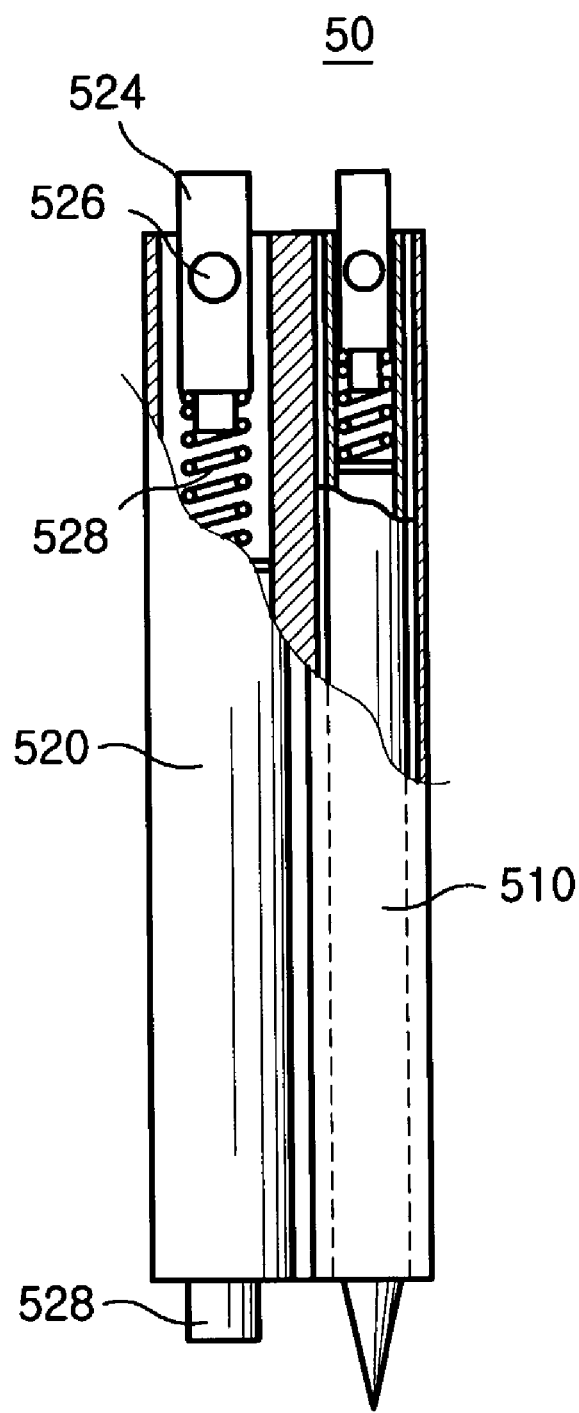

A description of the construction of the dual hinge 50 according to an embodiment of the present invention will be made with reference to FIGS. 12A and 12B. The dual hinge 50 comprises the first and second hinge bodies 510 and 520 or dual bodies which are integrally extended in the longitudinal direction, a hinge stylus 60 received in the first hinge body 510, an attaching unit provided in the second hinge body and a fixing hinge protrusion 528 provided in the other portion of the second hinge body 520. The first hinge body 510 of the dual hinge 50 is connected to the first housing via the hinge stylus 60, and the second hinge body 520 is connected to the second housing. The dual hinge 50 has the first and second hinge axes along hinge lines A1 and A2 for connecting the first and second housings in a mutually rotatable manner.

The first and second hinge bodies 510 and 520 respectively comprise the first and second openings 518 and 522 which have their own configurations. Since the hinge stylus 60 has an attaching unit constructed similar to that of the second hinge body 520, the construction of the attaching unit of the second hinge body 520 will be provided, without a description of the attaching unit of the hinge stylus 60.

The attaching unit has a hinge protrusion 524 which is movably guided in the longitudinal direction within one portion of the second hinge body 520 for restraining one end of the second hinge body 520, a spring 528 received in one end of the second hinge body 520 for forcing the second hinge protrusion 524 in a direction out of the second hinge body 520, and a fitting portion 526 which is projected through the opening 522 for preventing release of the hinge protrusion 524 from the second hinge body 520 and allowing movement of the same along the opening 522.

The hinge protrusion 524 is guided in the longitudinal direction of the second hinge body 510 and restrained in movement by the fitting portion 526. Also the hinge protrusion 524 can be attached/detached according to movement of the hinge protrusion 524.

Figure 13:
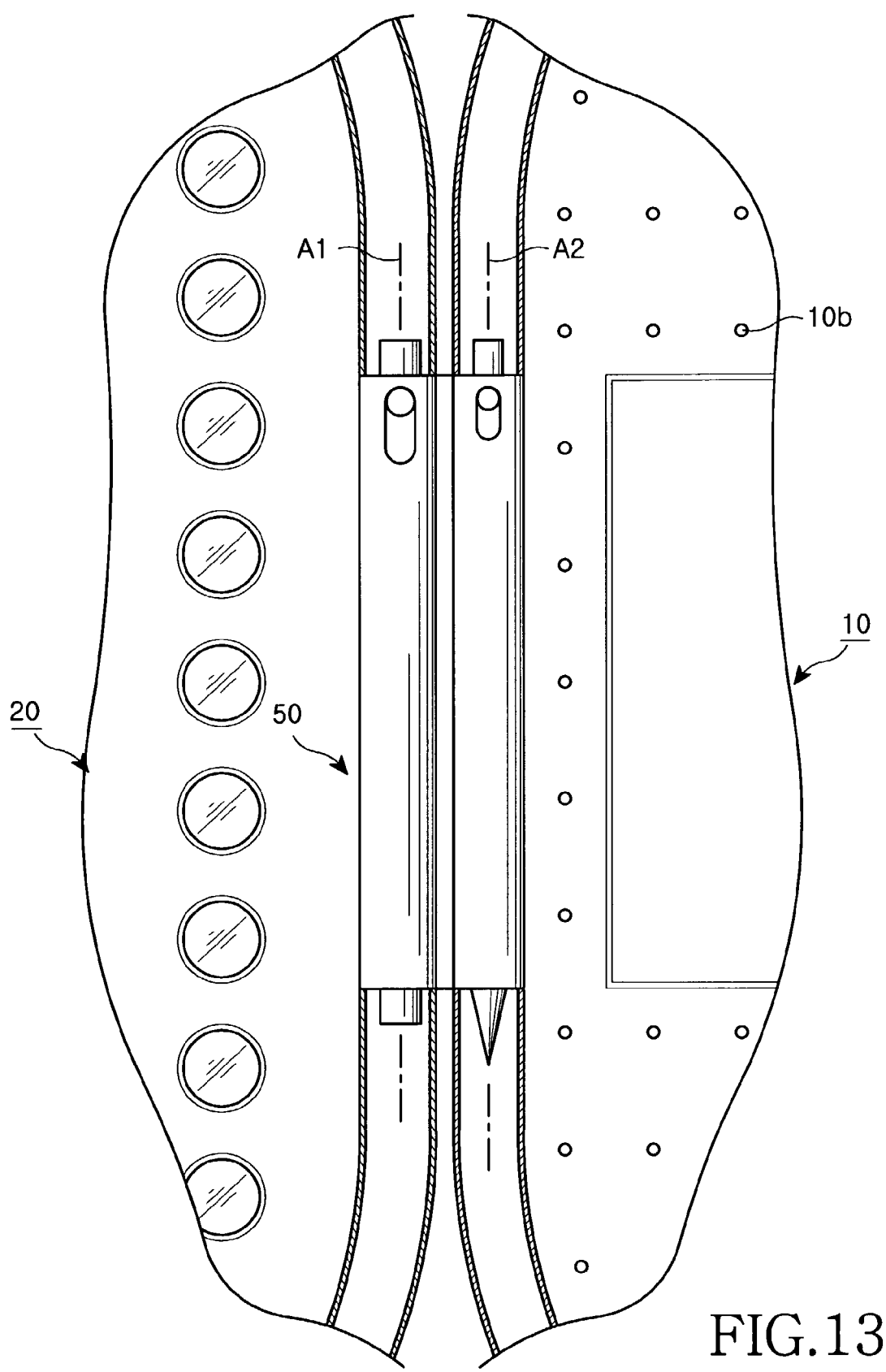
FIG. 13 is a plan view of another dual hinge adopted in the terminal according to an embodiment of the present invention.

FIG. 13 shows that the first and second housings are connected via the dual hinge. As shown in FIG. 13, the dual hinge 50 has the two hinge axes along hinge lines A1 and A2 for connecting the first and second housings 10 and 20 in a mutually rotatable manner. Accordingly, the mobile terminal according to the present invention can advantageously couple the sub-inputting unit to the housing via the stylus.

According to the invention as set forth above, the stylus can be received in the housing for ensuring portability and used as a hinge as well. Further, the invention adopts the sub-inputting unit in the terminal to enhance usability.

Although the invention has been shown and described with reference to certain preferred embodiments thereof, it will be understood by those skilled in the art that various changes in form and details may be made therein without departing from the spirit and scope of the invention as defined by the appended claims.

What is claimed is:

1. A mobile terminal comprising:
   (a) a first housing having a first rim portion disposed along an edge, said first rim portion having a first receiving portion of a predetermined length;
   (b) a hinge stylus detachably attached within said first receiving portion of the first rim portion;
   (c) a second housing having a second rim portion disposed along an edge, said second rim portion having a second receiving portion for detachably receiving said hinge stylus; and
   (d) a dual hinge having one hinge being received within said first receiving portion and the other hinge being coupled to said second housing for connecting said first and second housings in a rotatable manner along two parallel axes,
   wherein the dual hinge connects said first and second housings when said hinge stylus is detached from said first receiving portion.

2. The mobile terminal according to claim 1, wherein said stylus comprises:
   a stylus body being tubular in shape;
   an attaching unit disposed within one end of said stylus body; and
   a conical portion fixedly disposed within the other end of said stylus body.

3. The mobile terminal according to claim 2, wherein said attaching unit comprises:
   a hinge protrusion which is movably guided in a longitudinal direction in one portion of said stylus body for restraining one end of said stylus within said first or second receiving portion;
   a spring received adjacent to the one end of said stylus body for forcing said hinge protrusion in a direction out of said stylus body; and
   at least one fitting portion integrally disposed with said hinge protrusion, said fitting portion being positioned in and projected through at least one opening which is extended in a longitudinal direction in a predetermined shape for preventing release of said hinge protrusion from said stylus body and allowing movement of said hinge protrusion along said opening.

4. The mobile terminal according to claim 1, wherein said dual hinge is extended in a longitudinal direction with dual cylinders, one cylinder being connected to said first housing and the other cylinder rotatably connected to said second housing, to provide two parallel hinge axes, said dual hinge further comprising:
   two stylus bodies fixedly attached to each other each having at least one opening in one portion which are extended into a predetermined shape;
   a first and a second attaching unit each disposed in one of said openings for restraining one end of said two stylus bodies respectively to said first and second housings; and
   a first and a second hinge protrusion disposed in the other end of said stylus body for restraining the other end of said two stylus bodies respectively to said first and second housings.

5. The mobile terminal according to claim 4, wherein said attaching unit comprises:
   a hinge protrusion movably guided in a longitudinal direction in one portion of said stylus body for restraining one end of said stylus within said first or second receiving portion;
   a spring received in the one end of said stylus body for forcing the hinge protrusion in a direction out of said stylus body; and
   a fitting portion disposed in and projected through at least one opening for preventing release of said hinge protrusion from said stylus body and allowing movement of said hinge protrusion along said opening.

6. The mobile terminal according to claim 1, wherein said first and second receiving portions are cylindrically shaped.

7. The mobile terminal according to claim 1, wherein said first and second rim portions, hinge stylus and dual hinge are made of metal.

8. The mobile terminal according to claim 1, wherein said first housing comprises:
   a wide touch screen allowing data input via said hinge stylus;
   a rotatable camera lens housing disposed in an upper portion from said wide touch screen and having a rotatable camera lens; and
   a number of speaker holes disposed in the entire region of an upper plane of said first housing except for regions where said touch screen and said camera lens housing are located.

9. The mobile terminal according to claim 1, wherein said second housing functions as an auxiliary data input unit, and comprises:
   a microphone unit; and
   a plurality of keys disposed in an upper plane of said second housing except for where said microphone unit is located.

10. The mobile terminal according to claim 1, further comprising at least one key provided on said first and second rim portions.

11. A mobile terminal comprising:
   (a) a first housing having a first rim portion disposed along an edge, said first rim portion having a first receiving portion of a predetermined length;
   (b) a hinge stylus detachably attached within said first receiving portion of the first rim portion;
   (c) a second housing having a second rim portion disposed along an edge, said second rim portion having a second receiving portion for detachably receiving said hinge stylus; and
   (d) a dual hinge for receiving said hinge stylus in a longitudinal direction,
   wherein said dual hinge is coupled to the first and second receiving portions via said hinge stylus received therein for connecting said first and second housings in a rotatable manner to provide two parallel hinge axes, and said dual hinge connects said first and second housings when said hinge stylus is detached from said first receiving portion.

* * * * *